(12) United States Patent
Gilbert et al.

(10) Patent No.: US 9,161,250 B2
(45) Date of Patent: Oct. 13, 2015

(54) TRANSMISSION FREQUENCY SPECTRUM SCANNING

(71) Applicant: Imagination Technologies Limited, Kings Langley (GB)

(72) Inventors: Matt Gilbert, Chepstow (GB); Adrian John Anderson, Chepstow (GB); Christopher Owen, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/504,751

(22) Filed: Oct. 2, 2014

(65) Prior Publication Data

US 2015/0093995 A1    Apr. 2, 2015

(30) Foreign Application Priority Data

Oct. 2, 2013  (GB) .................................... 1317461.0
Sep. 8, 2014  (GB) .................................... 1415842.2

(51) Int. Cl.
*H04B 1/00*      (2006.01)
*H04W 24/08*   (2009.01)

(52) U.S. Cl.
CPC ..................................... *H04W 24/08* (2013.01)

(58) Field of Classification Search
CPC ....................................................... H04W 24/08
USPC .......................... 455/63.1, 313, 318; 375/225
See application file for complete search history.

(56) References Cited

FOREIGN PATENT DOCUMENTS

| CN | 1780376 A | 5/2006 |
|---|---|---|
| WO | WO-2007/050198 A1 | 5/2004 |
| WO | WO2010/057974 A1 | 5/2010 |

*Primary Examiner* — Hsin-Chun Liao
(74) *Attorney, Agent, or Firm* — Vorys, Sater, Seymour and Pease LLP; Vincent M DeLuca (57) ABSTRACT

Satellite scanning is an example of scanning a transmission spectrum, which relates to identifying satellite channels within a satellite broadcast spectrum. Rather than scanning the entire transmission spectrum at each possible combination of frequency and symbol rate, spectrum analysis may be performed over the transmission spectrum in order to determine an estimate of signal strength over the transmission spectrum in the frequency domain. The estimate of signal strength in the frequency domain can be used to identify candidate transmission channels (e.g. at frequencies where the signal strength is high). A targeted scan of the transmission spectrum can then be performed based on the identified candidate transmission in order to identify the transmission channels.

20 Claims, 8 Drawing Sheets

TRANSMISSION FREQUENCY SPECTRUM SCANNING

BACKGROUND

There are many types of signals which may be transmitted (e.g. broadcasted) to a receiver. For example, satellites may be used to transmit signals to satellite receivers. The signals may be any type of transmission signals such as broadcast signals including television signals or radio signals. It is useful for satellites to be in geostationary orbits around the Earth such that they maintain a fixed position relative to points on the Earth's surface. There are many different satellites in orbit around the Earth. A satellite may transmit multiple signals on multiple satellite channels. Frequency division may be used to distinguish between different satellite channels. That is, a satellite channel may be associated with a frequency range in which signals are transmitted on that channel, and there is typically a frequency gap (i.e. a guard interval) between different satellite channels, such that a satellite receiver can more easily distinguish between signals transmitted on different satellite channels.

Satellite broadcast signals might not be well-defined for particular geographical regions, e.g. because the signals from a satellite may be received over a wide area on the Earth's surface. Different satellites may broadcast satellite signals according to different formats. For example, the satellite channels transmitted from a first satellite may differ significantly (e.g. in frequency, bandwidth and/or coding protocol) to the satellite channels transmitted from a second satellite. Furthermore, one satellite may transmit multiple signals from different transponders (i.e. on different channels). A satellite receiver may be able to receive the satellite broadcast signals on multiple channels from a single satellite. Furthermore, by directing a dish of the satellite receiver towards different satellites, the satellite receiver may be able to receive satellite broadcast signals from different satellites. Typically, the frequencies of satellite broadcast signals are constrained to be within a satellite broadcast spectrum. That is, the satellite broadcast spectrum is the range of frequencies in which satellite signals may be broadcast. For example, the satellite broadcast spectrum may be the L-Band of the electromagnetic spectrum, which has frequencies in the approximate range from 1 to 2 GHz.

In order for a satellite receiver to properly receive and decode satellite signals, the satellite receiver first determines the frequencies and symbol rates of the satellite channels which it is receiving. A satellite receiver may do this by performing a two dimensional scan over the entire satellite broadcast spectrum at all frequencies and at all possible symbol rates. Typically, the satellite broadcast spectrum is approximately 1 GHz wide and the symbol rates may correspond to channel bandwidths from approximately 330 kHz to approximately 50 MHz. At each combination of frequency and symbol rate the satellite receiver may test the received signal to see if it can properly decode the signal: if it can properly decode the signal, then it is determined that there is a satellite channel at this frequency and symbol rate; but if it cannot properly decode the signal, then it is determined that there is not a satellite channel at this combination of frequency and symbol rate. A scan of the entire satellite broadcast spectrum performed in this way may take approximately twenty minutes to complete.

As well as satellite broadcast signals, other transmission signals may be transmitted to receivers, such as terrestrial broadcast signals (e.g. for terrestrial television and radio signals) or mobile telephony signals for transmitting signals within a mobile telephone network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Transmission spectrum scanning (e.g. satellite scanning) relates to identifying transmission channels within a transmission spectrum. Rather than scanning the entire transmission spectrum at each possible combination of frequency and symbol rate, spectrum analysis may be performed over the transmission spectrum in order to determine an estimate of signal strength over the transmission spectrum in the frequency domain. The estimate of signal strength in the frequency domain can be used to identify candidate transmission channels (e.g. at frequencies where the signal strength is high). A targeted scan of the transmission spectrum can then be performed based on the identified candidate transmission channels in order to identify the transmission channels. The transmission channels may for example be satellite channels within a satellite broadcast spectrum. In other examples, the transmission channels may be terrestrial broadcast channels within a terrestrial broadcast spectrum, or the transmission channels may be channels of a mobile telephone network.

In particular, there is provided a method of scanning a transmission spectrum, the method comprising: analysing received signals over the transmission spectrum to determine an estimate of the strength of the received signals as a function of frequency over the transmission spectrum; using the estimate of the strength of the received signals to identify candidate transmission channel frequencies within the transmission spectrum by: (i) performing edge detection on the estimate of the strength of the received signals in the frequency domain, and (ii) using the edge detection to search for a pattern in the estimate of the strength of the received signals in the frequency domain which is indicative of a candidate transmission channel, said pattern comprising a rising edge, a frequency interval and a falling edge, wherein the frequency interval between the rising edge and the falling edge is suitable for a transmission channel; and performing a targeted scan over the transmission spectrum based on the identified candidate transmission channel frequencies to thereby identify one or more transmission channels within the transmission spectrum.

There is also provided apparatus configured to scan a transmission spectrum, the apparatus comprising: a spectrum analyser module configured to analyse received signals over the transmission spectrum to determine an estimate of the strength of the received signals as a function of frequency over the transmission spectrum; a channel identifier module configured to identify candidate transmission channel frequencies within the transmission spectrum using the estimate of the strength of the received signals; and a scanning module configured to perform a targeted scan over the transmission spectrum based on the identified candidate transmission channel frequencies to thereby identify one or more transmission channels within the transmission spectrum, wherein the channel identifier module comprises: an edge detector module configured to perform edge detection on the estimate of the strength of the received signals in the frequency domain; and an analysis module configured to use the results of the edge detection to identify candidate transmission channel frequencies within the transmission spectrum by searching for a pattern in the estimate of the strength of the received signals in the frequency domain which is indicative of a candidate transmission channel, said pattern comprising a rising edge, a frequency interval and a falling edge, wherein the frequency interval between the rising edge and the falling edge is suitable for a transmission channel.

There is also provided a computer program product configured to scan a transmission spectrum, the computer program product being embodied on a computer-readable storage medium and configured so as when executed on a processor to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Common reference numerals are used throughout the figures, where appropriate, to indicate similar features.

DETAILED DESCRIPTION

Embodiments will now be described by way of example only. The main examples described herein relate to satellite broadcast signals within a satellite broadcast spectrum. However, corresponding techniques can be used for other types of transmission signals, for example for terrestrial broadcast signals which are broadcast within a terrestrial broadcast spectrum. As another example, corresponding techniques could be used in a mobile telephone system to allow a receiver (e.g. a mobile phone) to quickly determine the frequencies and symbol rates of the channels within a mobile telephone system, thereby allowing the receiver (e.g. the mobile phone) to properly receive and decode the signals which are transmitted in the mobile telephone system. This may be particularly useful when a mobile telephone is searching for a cell of the mobile telephone network in order to identify a channel on which it can communicate over the mobile telephone network.

Figure 1:
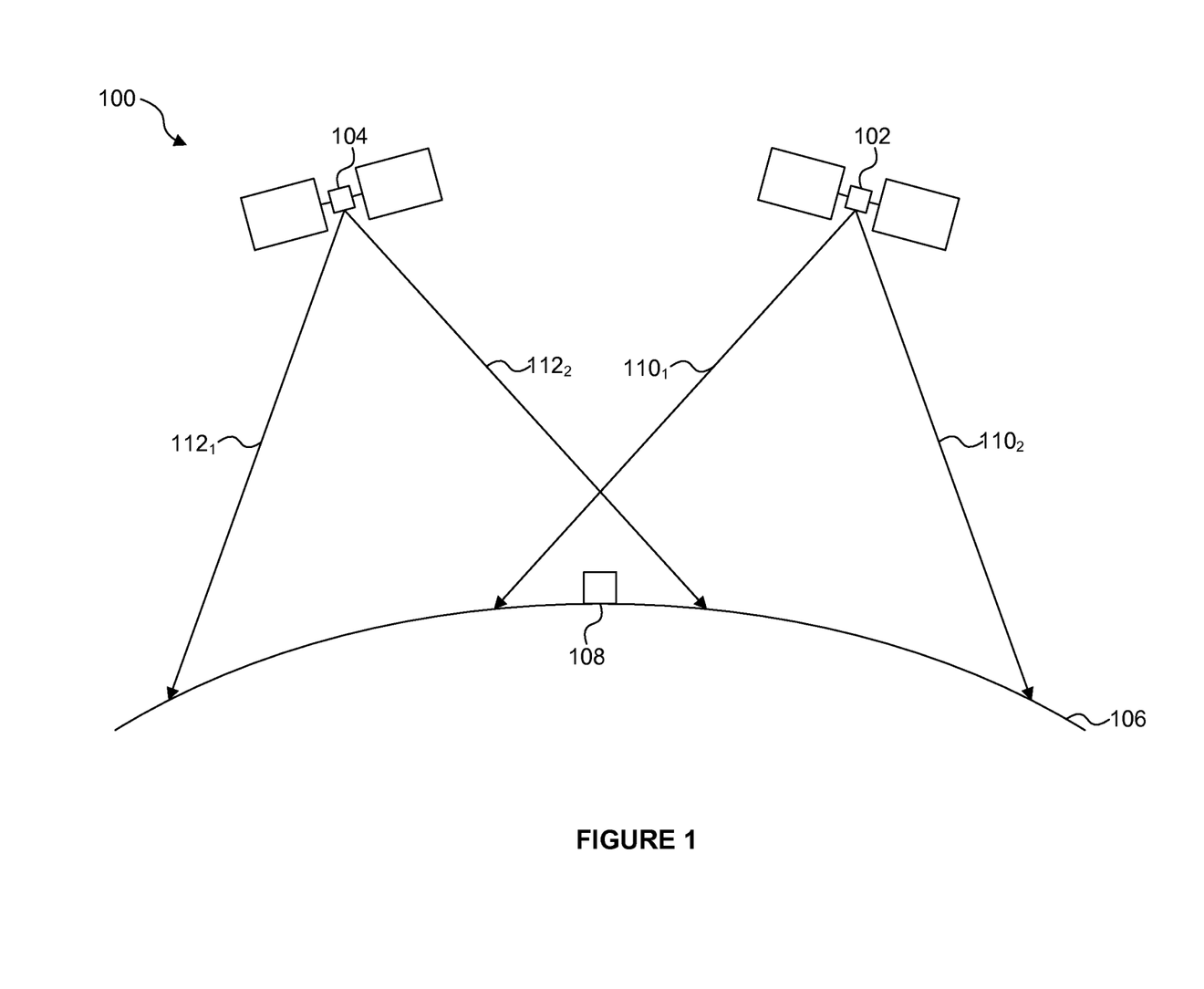
FIG. 1 is a simplified diagram of a satellite broadcast system.

FIG. 1 shows a satellite broadcast system 100. In the satellite broadcast system 100 shown in FIG. 1 there are two satellites 102 and 104 which are configured to broadcast satellite signals down to the surface of the Earth 106. The satellites 102 and 104 are in geostationary orbits around the Earth 106. Only two satellites are shown in FIG. 1 for clarity, but there may be more than two satellites in the satellite broadcast system 100. A satellite receiver 108 on the Earth 106 is arranged to receive satellite broadcast signals from one of the satellites 102 and 104 at a time, e.g. by directing a receiver dish towards one of the satellites 102 or 104. The range over which the signals from the satellite 102 are broadcast is shown by the lines $110_1$ and $110_2$. The range over which the signals from the satellite 104 are broadcast is shown by the lines $112_1$ and $112_2$. It is apparent in FIG. 1 that the satellite receiver 108 is positioned within the coverage area of both of the satellites 102 and 104, and therefore may receive satellite broadcast signals from both of the satellites 102 and 104 (but only from one at a time).

Figure 2:
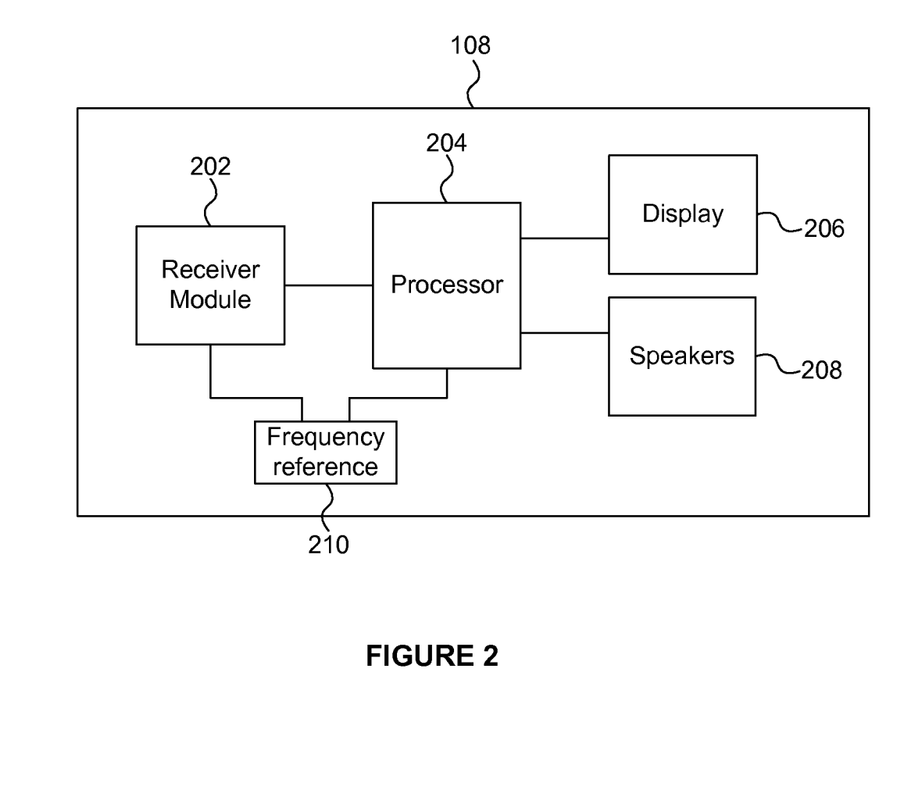
FIG. 2 is a schematic block diagram of a satellite receiver.

FIG. 2 shows a schematic diagram of the satellite receiver 108. The satellite receiver 108 comprises a receiver module 202, a processor 204, a display 206, speakers 208 and a frequency reference 210. As would be apparent to a person skilled in the art, the satellite receiver 108 may include further components to those shown in FIG. 2. The frequency reference 210 provides a signal at a particular frequency which can be used to control the timing of operations in the satellite receiver 108, e.g. the operations performed by the receiver module 202 and by the processor 204. The frequency reference 210 may provide a digital or an analogue signal, and may for example be implemented as a local clock in the satellite receiver 108, or as some other suitable oscillator. The receiver module 202 comprises an antenna which is configured to receive satellite signals which have been broadcast within the satellite broadcast spectrum (e.g. over the L-Band, which approximately corresponds to the frequency range from 1 to 2 GHz). The receiver module 202 may also comprise a Radio Frequency (RF) processing module (not shown in the Figures) which is configured to convert received satellite signals from the carrier radio frequency to a baseband frequency of the satellite receiver 108 in accordance with the signals provided by the frequency reference 210.

The received satellite signals are passed to the processor 204 which is configured to process the satellite signals, as described in more detail below. Decoded signals may be output from the processor 204, e.g. to I/O devices of the satellite receiver 108 such as the display 206 and/or the speakers 208 in order to output the decoded signals. For example, if the received satellite signals are radio signals then the decoded radio signals may be output from the speakers 208, e.g. to a user of the satellite receiver 108. If the received satellite signals are television signals then the decoded signals may be output from the display 206 and the speakers 208, e.g. to a user of the satellite receiver 108. The decoded signals may be provided from the processor 204 to other components of the satellite receiver 108 which are not shown in FIG. 2, e.g. to a memory for storage therein or to a transmitter for re-transmission of the signals from the satellite receiver 108.

Figure 3:
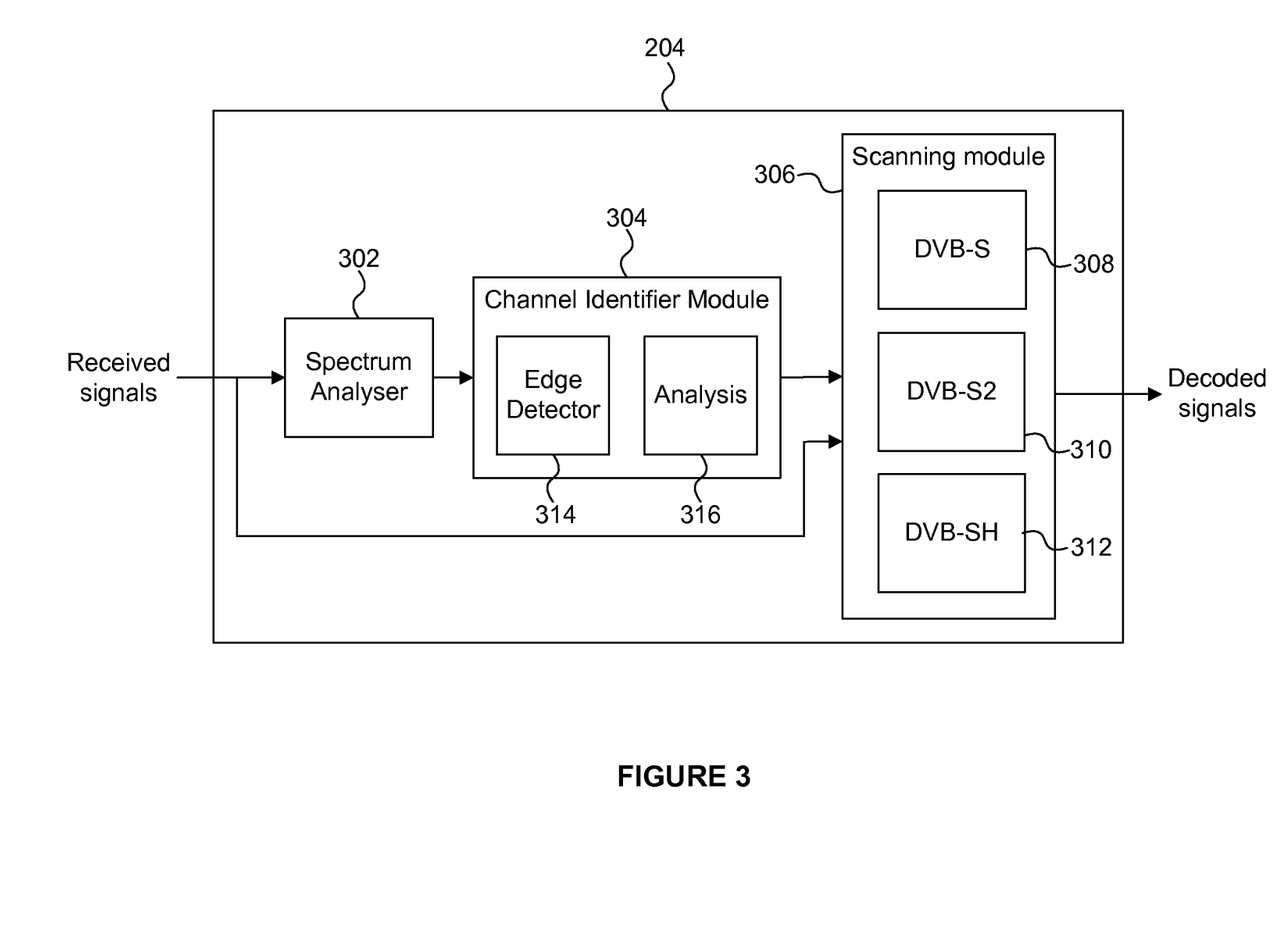
FIG. 3 is a functional block diagram of a processor of a satellite receiver.

FIG. 3 shows a functional block diagram of modules which can be implemented by the processor 204 of the satellite receiver 108. The processor 204 implements a spectrum analyser module 302, a channel identifier module 304, and a scanning module 306. The channel identifier module 304 comprises an edge detector module 314 and an analysis module 316. As described below, the edge detector module 314 is configured to detect edges in the output from the spectrum analyser module 302, and the analysis module 316 is configured to process an output from the edge detector module 314 to determine which edges appear to describe satellite channels (e.g. which edges are suitably spaced with suitable gradients for representing a satellite channel). The scanning module 306 comprises a plurality of satellite receiver modules (e.g. denoted 308, 310 and 312 in FIG. 3) which are configured to identify satellite channels adhering to respective satellite broadcast standards within the satellite broadcast spectrum. In the example shown in FIG. 3, the satellite receiver module 308 is configured to identify satellite channels adhering to the Digital Video Broadcasting Satellite (DVB-S) standard; the satellite receiver module 310 is configured to identify satellite channels adhering to the second generation Digital Video Broadcasting Satellite (DVB-S2) standard; and the satellite receiver module 312 is configured to identify satellite channels adhering to the Digital Video Broadcasting Satellite services to Handhelds (DVB-SH) standard. There may be other satellite receiver modules in the scanning module 306 for identifying satellite channels adhering to other satellite broadcast standards, but for clarity they are not shown in FIG. 3. The modules of the processor 204 shown in FIG. 3 may be implemented in software, hardware or a combination thereof.

Figure 4:
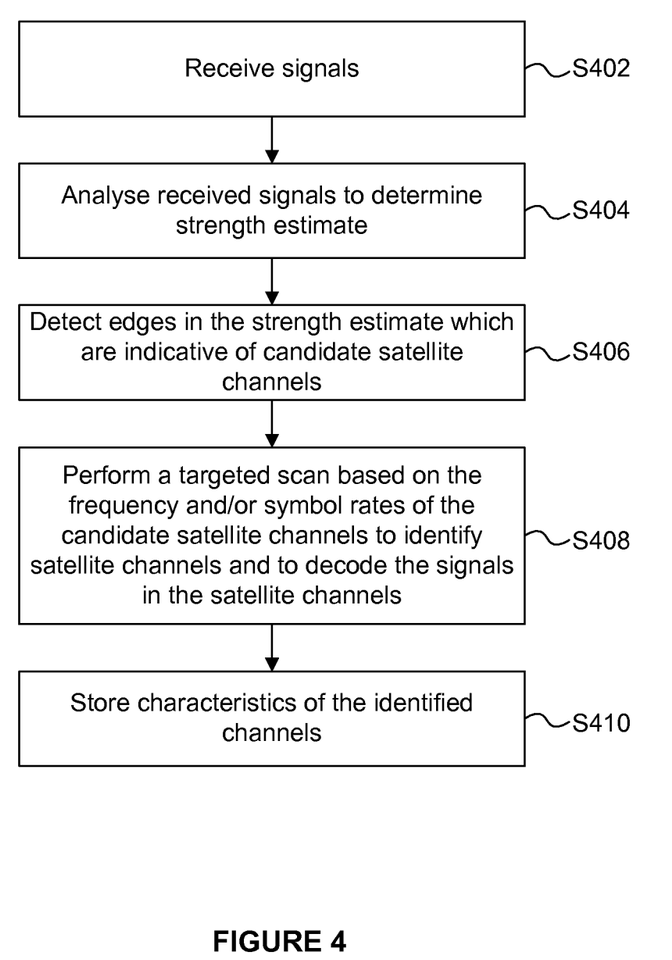
FIG. 4 is a flow chart for a method of scanning a satellite broadcast spectrum.

Operation of the satellite receiver 108 is now described with reference to the flow chart of FIG. 4. In step S402 satellite broadcast signals are received at the receiver module 202 (e.g. by an antenna) from one of the satellites 102 or 104. The signals are received over the entire satellite broadcast spectrum, which as described above may be in the L-Band, e.g. in the approximate frequency range of 1 to 2 GHz. The method described below is used to scan the satellite broadcast spectrum to identify the satellite channels which are available to the satellite receiver 108.

The received signals are passed from the receiver module 202 to the spectrum analyser module 302 of the processor 204. The spectrum analyser module 302 can be implemented as any module which can analyse the received signals in the frequency domain, as described herein. In step S404 the spectrum analyser module 302 analyses the received signals over the satellite broadcast spectrum to determine an estimate of the strength of the received signals as a function of frequency over the satellite broadcast spectrum. This may be performed in any suitable manner, for example, the spectrum analyser module 302 may perform a Fourier analysis (e.g. by implementing a Fast Fourier Transform (FFT)) on the received signals to determine the estimate of the strength of the received signals in the frequency domain. Fourier analysis is a well known technique for determining a representation of a time domain signal (e.g. the received signal) in the frequency domain. The Fourier analysis may be performed separately over different frequency sections of the satellite broadcast spectrum, and the results of the Fourier analysis over the different sections may then be combined to determine the estimate of the strength of the received signals in the frequency domain. In order to do this, the receiver module 202 tunes to a particular section of the satellite broadcast spectrum, and the spectrum analyser module 302 stores a sequence of the received signals and performs an FFT on that sequence of received signals to thereby form a vector representing the received signal strength in the particular section of the satellite broadcast spectrum. The spectrum analyser module 302 instructs the receiver module 202 to tune to a different section of the satellite broadcast and the process is repeated in order to form a vector representing the received signal strength in the different section of the satellite broadcast spectrum. This is repeated until multiple vectors for the sections can be combined to represent the received signal strength over the whole (or at least most) of the satellite broadcast spectrum. It is useful to perform the Fourier analysis separately over the different frequency sections of the satellite broadcast spectrum because the receiver module 202 may have a maximum bandwidth (e.g. of 60 MHz) to which it can tune. Therefore, to get the complete spectrum in such examples, the spectrum is sampled in sections (e.g. 60 MHz or so at a time), and then the sections are combined to get the complete spectrum. This allows the receiver 108 to work with any receiver bandwidth, e.g. by reconfiguring the size of the spectrum fragments that are captured. Furthermore, performing the Fourier analysis over sections of the spectrum allows the receiver 108 to compensate for tuner characteristics of the receiver module 202. For example, if the receiver module 202 had a non-flat passband, the spectrum analyser module 302 might only use the flat part in a section, and then tune the receiver module 202 to a different section of the spectrum so that only fragments from the flat parts of the passband are combined.

In other examples, the Fourier analysis is performed over the whole satellite broadcast spectrum at once, i.e. it is not split up into sections. The "strength" of the signals may be represented by any suitable parameter, e.g. the power or peak amplitude.

Figure 5:
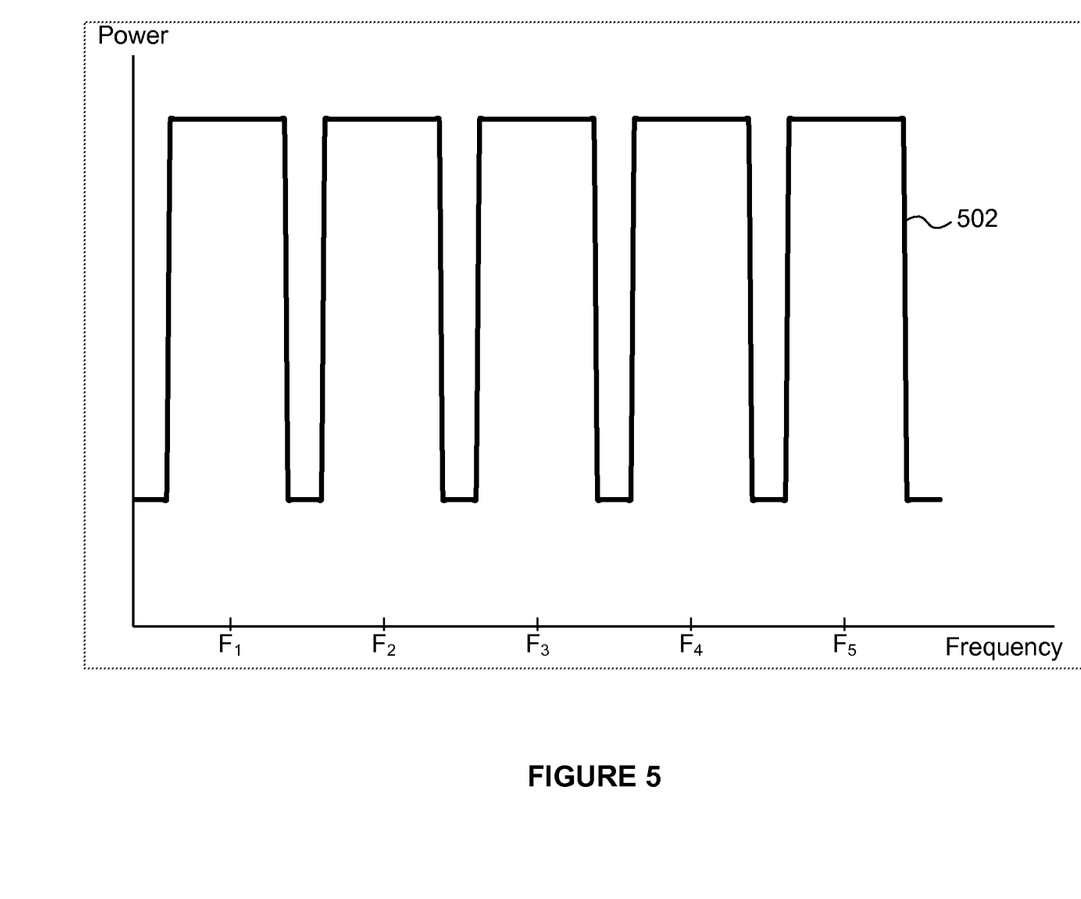
FIG. 5 is a graph showing a first example of the power of received satellite signals as a function of frequency.

FIG. 5 shows a simple example of an estimate of the strength (which in this case is power) of the received signals (shown as the line 502) as a function of frequency which results from the analysis performed by the spectrum analyser module 302 in step S404. In the example shown in FIG. 5 there are five clear satellite channels within the satellite broadcast spectrum, which respectively have centre frequencies at $F_1$, $F_2$, $F_3$, $F_4$ and $F_5$. The power of the received signals at frequencies within the satellite channels is significantly higher than the power of the received signals at frequencies between the satellite channels. In the simple example shown in FIG. 5, the received signals are experiencing very little noise so the peaks of the satellite channels in the graph shown in FIG. 5 are clear and well-defined. The bandwidths of the satellite channels (i.e. the widths in the frequency domain of the satellite channels) are the same as each other in this example, and may for example each be 45 MHz. The bandwidth of a satellite channel is related to the symbol rate of the signals transmitted on the satellite channel. For example, the wider the bandwidth of a satellite channel, the higher the symbol rate of the signals transmitted on the satellite channel. As an example, the bandwidth of a satellite channel may be proportional to the symbol rate of the signals transmitted on the satellite channel. As a simple example, a satellite channel with a bandwidth of 45 MHz may transmit signals at a symbol rate of 45 million symbols per second.

Once the estimate of the strength of the received signals in the frequency domain has been determined, it can be used to identify the satellite channels in the satellite broadcast spectrum (e.g. identify the frequency and symbol rate of the satellite channels). That is, the shape and/or magnitude of the estimate of the strength of the received signals in the frequency domain may be used to identify the satellite channels in the satellite broadcast spectrum. In order to do this, the estimate of the strength of the received signals in the frequency domain (e.g. as depicted in FIG. 5) is passed to the edge detector module 314 of the channel identifier module 304. In step S406 the edge detector module 314 detects edges in the estimate of the strength of the received signals in the frequency domain. Particular patterns of edges in the estimate may be indicative of satellite channels. The analysis module 316 analyses the edges detected by the edge detection module 314 in order to identify channels, as described in more detail below. In this way, the channel identifier module 304 identifies candidate satellite channel frequencies within the satellite broadcast spectrum, and may also identify candidate symbol rates of the candidate satellite channels based on the bandwidth of the candidate satellite channels. The candidate satellite channels are used later in the scanning module 306 to find the exact frequencies and symbol rates of the satellite channels to thereby identify the satellite channels in the satellite broadcast spectrum.

The edge detection implemented by the edge detector module 314 is used by the analysis module 316 to search for a pattern in the estimate of the strength of the received signals in the frequency domain which is indicative of a candidate satellite channel. A candidate satellite channel is characterised in the frequency domain by a rising edge then a frequency interval followed by a falling edge. Therefore, the analysis module 316 can identify a channel by finding edges that appear are suitably spaced in the frequency domain and have a suitable gradient given the spacing. The thinner a channel is, the sharper the edges should be (i.e. the larger the gradient of the edges should be). The frequency interval between the rising edge and the falling edge gives an indication of the bandwidth of the candidate satellite channel which corresponds to a candidate symbol rate of the candidate satellite channel.

In the simple example where the estimate of the strength of the received signals is shown by the graph of FIG. 5, the channel identifier module 304 will identify five candidate satellite channels having centre frequencies at $F_1$, $F_2$, $F_3$, $F_4$ and $F_5$. The channel identifier module 304 also identifies that each of the candidate satellite channels has the same candidate symbol rate, e.g. which corresponds to a candidate satellite channel bandwidth of 45 MHz.

The scanning module 306 receives the received signals. The scanning module 306 also receives the identified candidate satellite channel frequencies and candidate symbol rates from the channel identifier module 304. In step S408 the scanning module 306 performs a targeted scan over the satellite broadcast spectrum based on the identified candidate satellite channel frequencies (and optionally further based on the candidate symbol rates) to thereby identify one or more satellite channels within the satellite broadcast spectrum. That is, the scanning module 306 may use the candidate frequencies and candidate symbol rates of the candidate satellite channels to reduce the two dimensional search space that is covered by the scanning process. For each candidate satellite channel frequency, the scanning module 306 may search for a satellite channel having a high symbol rate first and if no satellite channel is found then the symbol rate is reduced and another search is performed. The scanning module 306 starts searching at a high symbol rate before dropping down to a lower symbol rate because the time taken to scan for a channel is largely dominated by the symbol rate. The algorithm implemented by the scanning module 306 has to process a certain number of samples, so the higher the symbol rate, the faster the scanning module 306 can complete a search. Furthermore, the search for a channel at a particular bandwidth may find a channel that has a bandwidth within a percentage of the particular bandwidth. Therefore, the higher the particular bandwidth that is being searched for, the greater the frequency range of the satellite spectrum that is covered with a single search.

In some examples, the symbol rate is not reduced. For example, a maximum and minimum symbol rate that we think a candidate could be is used. Initially the scanning module 306 searches at a rate that will cover the maximum symbol rate, and this may also cover the minimum symbol rate, so only a single search at a particular frequency is needed to cover all of the symbol rates. However, in some cases the initial search does not cover the minimum symbol rate, so the scanning module 306 reduces the symbol rate of the search, as described above, until the minimum symbol rate has been covered.

As described above, the scanning module 306 comprises a plurality of satellite receiver modules which are configured to perform the targeted scan for a respective plurality of satellite broadcast standards. For example, the DVB-S module 308 performs a targeted scan to identify one or more satellite channels adhering to the DVB-S standard within the satellite broadcast spectrum; the DVB-S2 module 310 performs a targeted scan to identify one or more satellite channels adhering to the DVB-S2 standard within the satellite broadcast spectrum; and the DVB-SH module 312 performs a targeted scan to identify one or more satellite channels adhering to the DVB-SH standard within the satellite broadcast spectrum.

In order to perform the targeted scan a satellite receiver module (e.g. the DVB-S module 308) attempts to decode the received signals at a particular frequency and symbol rate. If the received signals can be properly decoded at the particular frequency and symbol rate then the satellite receiver module has identified a satellite channel at the particular frequency and symbol rate. In this case, the received signals are decoded by the scanning module 306 (e.g. by one of the satellite receiver modules 308, 310 or 312) and in step S410 characteristics of the identified satellite channel are stored, e.g. in a memory. The characteristics of the identified satellite channel may be used subsequently to quickly tune to the identified channel, for decoding received satellite signals on the channels and outputting the decoded signals, e.g. to the display 206 or speakers 208 as described above. However, if the received signals cannot be properly decoded at the particular frequency and symbol rate then the satellite receiver module has determined that there is not a satellite channel of the particular standard (e.g. DVB-S) at the particular frequency and symbol rate. The satellite receiver then moves on to a different combination of frequency and symbol rate, and repeats the search for a satellite channel. The search is repeated at many different frequencies and symbol rates.

In examples described herein, the scan performed by the scanning module 306 is referred to as a "targeted scan" (in contrast to a "blind scan") because the scan is not performed for every combination of frequency and symbol rate in the satellite broadcast spectrum (as in the prior art described in the background section above). Instead, the scan is limited to a subset of the possible combinations of frequency and symbol rate in the satellite broadcast spectrum, based on knowledge of the candidate satellite channel frequencies, and further optionally based on knowledge of the candidate symbol rates, as determined by the channel identifier module 304. In this way, the scan performed by the scanning module 306 is "targeted", such that it is performed at, and/or in the proximity of, the frequencies identified as being candidate satellite channel frequencies by the channel identifier module 304. For frequencies and/or symbol rates at which the channel identifier module 304 has not identified a candidate satellite channel, the scanning module 306 might not perform a search for a satellite channel. This reduces the number of frequency and symbol rate combinations at which the scanning module 306 searches for satellite channels (compared to the blind scan performed in the systems described in the background section above). The scan performed by the scanning module 306 is targeted to those frequencies and/or symbol rates at which satellite channels are likely to be present based on the results of the edge detection performed by the edge detector module 314 of the channel identifier module 304.

Therefore, the analysis of the received signals over the satellite broadcast spectrum to determine the estimate of the strength of the received signals as a function of frequency is used to limit (i.e. "target") the searches that are performed by the scanning module 306. In this way, the satellite receiver 108 can identify the satellite channels, without any prior knowledge of the satellite channels that are present, e.g. in approximately forty seconds, which is much faster than in the prior art described above in the background section which takes approximately twenty minutes to identify the satellite channels by performing a blind scan of all frequency and symbol rate combinations over the satellite broadcast spectrum.

When a satellite receiver module (308, 310 or 312) searches for a satellite channel with a frequency of f and symbol rate s (corresponding to a bandwidth b) then the satellite receiver module may identify a satellite channel having a frequency within a range from $(f-\epsilon_f)$ to $(f+\epsilon_f)$ and with a symbol rate within a range from $(s-\epsilon_s)$ to $(s+\epsilon_s)$ corresponding to a bandwidth within a range from $(b-\epsilon_b)$ to $(b+\epsilon_b)$. The values of $\epsilon_f$ and $\epsilon_b$ may or may not be equal to each other, and may vary depending upon the specific implementation, but may be approximately $$\frac{b}{4}.$$

For example, if a satellite receiver module is searching for a satellite channel at a frequency of 1.5 GHz (i.e. f=1.5 GHz) with a symbol rate corresponding to a bandwidth of 40 MHz (i.e. b=40 MHz), and if $$\varepsilon_f = \varepsilon_b = \frac{b}{4},$$

then the satellite receiver module may find a satellite channel having a centre frequency in a range from 1490 MHz to 1510 MHz with a bandwidth in a range from 30 MHz to 50 MHz. It can be appreciated that in this example, the maximum error in the candidate satellite channel frequency which can be tolerated (in the sense that the satellite channel will still be identified) is given by $\epsilon_f$ which is equal to $$\frac{b}{4}.$$

Therefore, satellite channels with higher bandwidths can be identified with a greater error in the candidate satellite channel frequency.

The different satellite receiver modules 308, 310 and 312 may be operated in parallel or in series. If they are operated in parallel then each of the satellite receiver modules 308, 310 and 312 performs a targeted scan over all of the identified candidate frequencies and candidate symbol rates to find satellite channels according to the respective satellite standards.

If the satellite receiver modules 308, 310 and 312 are operated in series, then a first one of the satellite receiver modules (e.g. the DVB-S module 308) performs a targeted scan over all of the identified candidate frequencies and candidate symbol rates to find satellite channels of the respective satellite standard (e.g. the DVB-S standard). Then a second one of the satellite receiver modules (e.g. the DVB-S2 module 310) performs a targeted scan over any of the identified candidate frequencies and candidate symbol rates which were not identified by the first satellite receiver module (e.g. the DVB-S module 308) to thereby find satellite channels of the respective satellite standard (e.g. the DVB-S2 standard). Then a third one of the satellite receiver modules (e.g. the DVB-SH module 312) performs a targeted scan over any of the identified candidate frequencies and candidate symbol rates which were not identified by the previous satellite receiver modules (e.g. the DVB-S module 308 and the DVB-S2 modules 310) to thereby find satellite channels of the respective satellite standard (e.g. the DVB-SH standard). This can be repeated in sequence for any other satellite receiver modules in the scanning module 306. The order in which the satellite receiver modules of the different standards are applied may make a difference to the speed at which the satellite channels are found. The algorithms are very fast to detect a channel of the relevant standard when it is there, but slow when there is no channel, since it has to search all possibilities. Therefore, most commonly used standards are searched first before other standards are searched. For example, DVB-S tends to be the most common standard, so the DVB-S module 308 may search for a satellite channel adhering to the DVB-S standard before other modules search for satellite channels adhering to other standards. In this way the number of remaining candidates to be searched for standards after the DVB-S search has completed is reduced.

Furthermore, there may be some commonality between different standards (e.g. between DVB-S and DVB-S2 standards), which can be usefully exploited. If the DVB-S module 308 locks onto a valid symbol stream, and gets timing and carrier lock, but then fails to identify a channel, then it is likely that this is a channel of a different standard. This information could be passed onto the next module (e.g. to the DVB-S2 module 310) to give it the exact symbol rate and frequency where a channel is likely to be found. This could reduce the time the DVB-S2 module 310 takes to find the channel. Furthermore, any candidates that definitely have nothing at a particular frequency and symbol rate (as determined by the DVB-S module 308) might not be searched by the DVB-S2 module 310 on the basis that if there was a channel to be found at that particular frequency and symbol rate then the DVB-S module 308 would have found this. In general, information determined from the targeted scan performed by one of the satellite receiver modules (e.g. the DVB-S module 308) may be used by another one of the satellite receiver modules which is later in the series of the satellite receiver modules (e.g. the DVB-S2 module 310) to direct the targeted scan of the later of the satellite receiver modules (e.g. the DVB-S2 module 310). In this way, the time taken by the targeted scan of the later of the satellite receiver modules (e.g. the DVB-S2 module 310) may be reduced.

Figure 6:
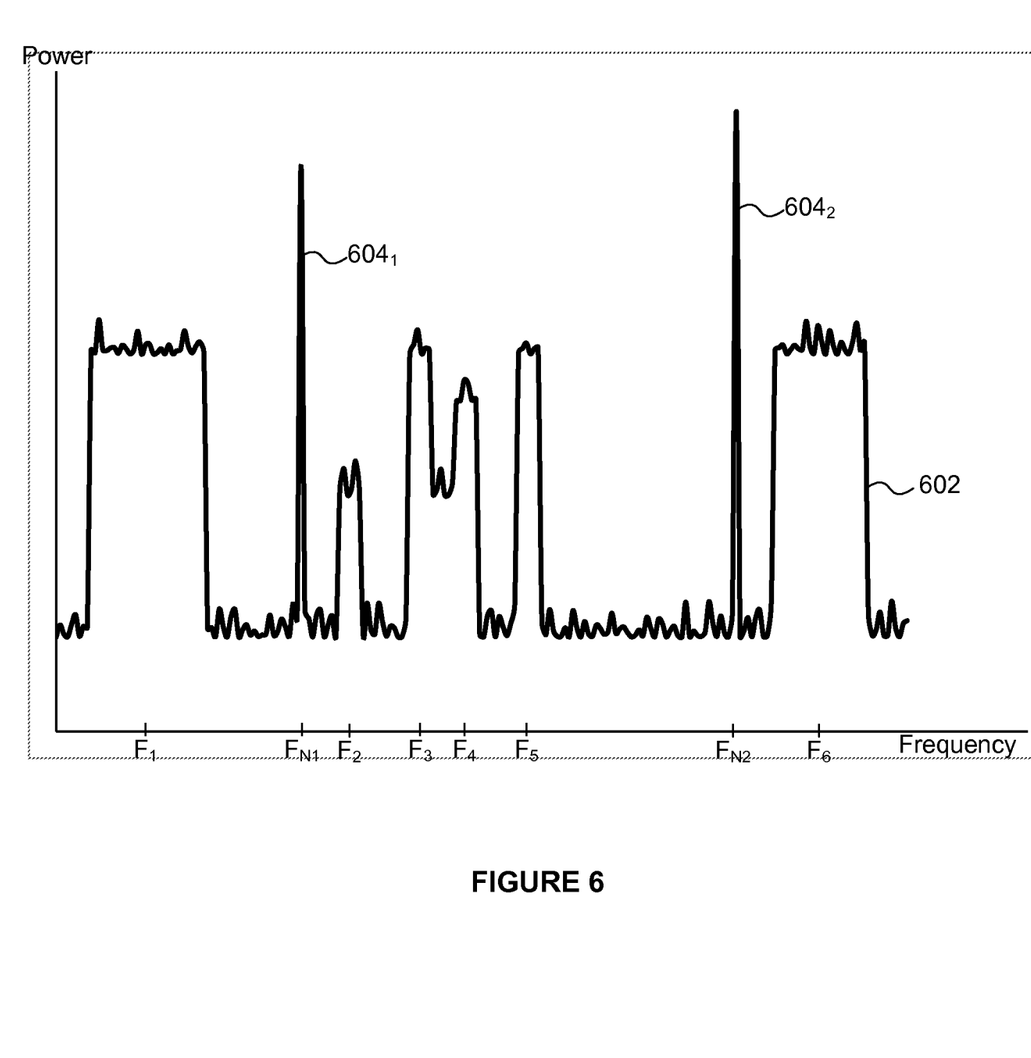
FIG. 6 is a graph showing a second example of the power of received satellite signals as a function of frequency.

FIG. 6 is a graph showing a second example of the power of received satellite signals 602 as a function of frequency. The satellite channels in the example shown in FIG. 6 are more difficult to identify than those shown in FIG. 5. In the example shown in FIG. 6, there are six satellite channels with respective centre frequencies at $F_1$, $F_2$, $F_3$, $F_4$, $F_5$ and $F_6$. It can be seen in FIG. 6 that the satellite channels do not all have the same bandwidth, and therefore do not all have the same symbol rate. The satellite channels with centre frequencies $F_1$ and $F_6$ have higher symbol rates than the satellite channels with centre frequencies $F_2$, $F_3$, $F_4$ and $F_5$. In one example, the largest bandwidth that a satellite channel may have in the satellite broadcast spectrum is 50 MHz and the smallest bandwidth that a satellite channel may have in the satellite broadcast spectrum is 330 kHz.

It can also be seen in FIG. 6 that there is some noise in the estimate of the power in the frequency domain. Before the channel identifier module 304 identifies the candidate satellite channels, the estimate of the power of the received signals in the frequency domain may be filtered in order to suppress the noise therein. The filtering of the power estimate may be implemented in a filtering module within the edge detector module 314. An echo in the received signal will give rise to a sinusoidal amplitude variation in the frequency domain. In satellite receivers, because they often have a line of sight path to the satellite, any large echoes in the received signal are likely to be caused by the cables in the receiver architecture. Echoes can be detected and compensated for in the receiver 108. For example, once a signal has been successfully identified, the signal can be demodulated using a demodulator that incorporates an adaptive equaliser, to thereby measure the echo. Information on the echo can then be passed back to the channel identifier module 304, which can apply compensation, thereby removing (or attenuating) the effects of the echo. That is, the equaliser may adapt a set of filter coefficients which can be used to counteract echo in the received signal. A filtering module (e.g. within the edge detector module 314) filters the output of the spectrum analyser module 302 before the edge detection process is performed on the received signal by the edge detector module 314. The filter coefficients, as adapted by the equaliser, are used by the filtering module (e.g. in the edge detector module 314) to post-process the output of the spectrum analyser module 302 to remove (or attenuate) the effect of the echo from the received signal.

Furthermore, there are two noise spikes $604_1$ and $604_2$ in the power estimate shown in FIG. 6 occurring at frequencies $F_{N1}$ and $F_{N2}$ respectively. Noise spikes in the frequency domain correspond to regularly occurring noise in the time domain as the satellite signals are received. If the channel identifier module 304 identified candidate satellite channels merely by searching for rising and/or falling edges then the frequencies of the noise spikes ($F_{N1}$ and $F_{N2}$) would be mistakenly identified as candidate satellite channel frequencies. Furthermore, it can also be seen in FIG. 6 that the power of the satellite channel at centre frequency $F_2$ is approximately at the same power level as the noise between the satellite channels with centre frequencies at $F_3$ and $F_4$. Therefore, using a cut-off power level to identify candidate satellite channels might not be sufficient to identify candidate satellite channels with relatively low powers, such as the candidate satellite channel at frequency $F_2$.

To overcome these problems, as described above, when the edge detector module 314 detects edges in the estimate of the strength of the received signals, the analysis module 316 searches for a pattern in the frequency domain comprising a rising edge, a frequency interval and then falling edge. The analysis module 316 may identify a rising edge when, the power estimate has a gradient in the frequency domain which is greater than a positive threshold gradient. Another condition for identifying a rising edge may be that the value of the power estimate increases by more than a threshold amount, to thereby reduce the likelihood that short, but sharp, increases caused by noise are mistakenly identified as rising edges. Similarly, the analysis module 316 may identify a falling edge when, the power estimate has a gradient in the frequency domain which is less than a negative threshold gradient. Another condition for identifying a falling edge may be that the value of the power estimate decreases by more than a threshold amount, to thereby reduce the likelihood that short, but sharp, decreases caused by noise are mistakenly identified as falling edges. The gradients of the edges of a satellite channel peak give an indication to the bandwidth, and therefore the symbol rate, of the satellite channel. Typically, a satellite channel with a relatively small bandwidth, and therefore a relatively low symbol rate, will have steeper edges in the frequency domain, i.e. the gradient of the rising edge will be higher and the gradient of the falling edge will be lower, than a satellite channel with a relatively large bandwidth, and therefore a relatively high symbol rate. Therefore, the gradient of an edge of a candidate satellite channel can be used to provide an indication as to the likely symbol rate of the candidate satellite channel.

The edge detection may be performed at a plurality of different scales which are associated with respective frequency ranges. At each of the scales the edge detection is used to search for a pattern with a frequency interval within the respective frequency range. For example, the edge detection may be performed at three different frequency scales: a wide scale, a medium scale and a thin scale. For example, the channel identifier module 304 may perform edge detection on the wide scale by searching for a pattern in the frequency domain power estimate which comprises a rising edge and a falling edge (with gradients that are suitable for wide channels) with a frequency interval between the rising and falling edges in the range from 20 to 60 MHz, as an example. In other words the channel identifier module 304 searches for a candidate satellite channel with a bandwidth in the range from 20 MHz to 60 MHz. The wide scale includes the maximum bandwidth which a satellite channel may have in the satellite broadcast spectrum, which in this example is 50 MHz. The channel identifier module 304 may also perform edge detection on the medium scale by searching for a pattern in the frequency domain power estimate which comprises a rising edge and a falling edge (with gradients that are suitable for medium bandwidth channels) with a frequency interval between the rising and falling edges in the range from 5 to 30 MHz, as an example. In other words the channel identifier module 304 searches for a candidate satellite channel with a bandwidth in the range from 5 MHz to 30 MHz. The channel identifier module 304 may also perform edge detection on the thin scale by searching for a pattern in the frequency domain power estimate which comprises a rising edge and a falling edge (with gradients that are suitable for narrow channels) with a frequency interval between the rising and falling edges in the range from 330 kHz to 8 MHz, as an example. In other words the channel identifier module 304 searches for a candidate satellite channel with a bandwidth in the range from 330 kHz to 8 MHz. The thin scale includes the minimum bandwidth which a satellite channel may have in the satellite broadcast spectrum, which in this example is 330 kHz. It can therefore be seen that the combination of the wide, medium and thin scales cover all of the bandwidths which satellite channels may have in the satellite broadcast spectrum. That is, in the example given above, the wide, medium and thin channels cover overlapping frequency ranges which go from the minimum to the maximum possible bandwidth that a satellite channel may have in the satellite broadcast spectrum. In this example the frequency ranges of the different scales overlap, but in other examples the frequency ranges of the different scales might not overlap (e.g. they may be contiguous). The frequency ranges given above are merely examples, and other frequency ranges may be used in other examples. It is noted that the noise spikes $604_1$ and $604_2$ are too narrow in the frequency domain to be identified as candidate satellite channels even when the channel identifier module 304 is operating at the thin scale. In this way noise spikes are not mistakenly identified as candidate satellite channels.

The channel identifier module 304 may search for a pattern in the estimate of the strength of the received signals at the wide scale then at the medium scale and then at the thin scale. The edge detector module 314 does not report the edge gradient, but instead reports edges with suitable gradients for the relevant scale that is currently being searched which are above a certain threshold, since this is more robust. At each of the scales the edge detection comprises detecting edges which have a gradient within a particular gradient range which is indicative of channels with a bandwidth within the frequency range for the scale. Because satellite channel width and gradient are related, only pairs of edges with a suitable gradient and width are considered to be a channel. So, at a particular scale, the analysis module 316 receives, from the edge detector module 314, a list of edge locations and the directions of those edges (e.g. rising or falling) for the particular scale, and the analysis module 316 tries to identify pairs of edges a suitable width apart which could represent a channel. As described above, the analysis module 316 scans the results from the edge detector module 314 in scale-order, from the wide scale to the thin scale. As an example, this means that if there is a channel at the wide scale, the analysis module 316 might not need to search for candidates at lower bandwidths (e.g. at the medium or thin scales) within this frequency range because a channel has already been found within the frequency range.

Figure 7:
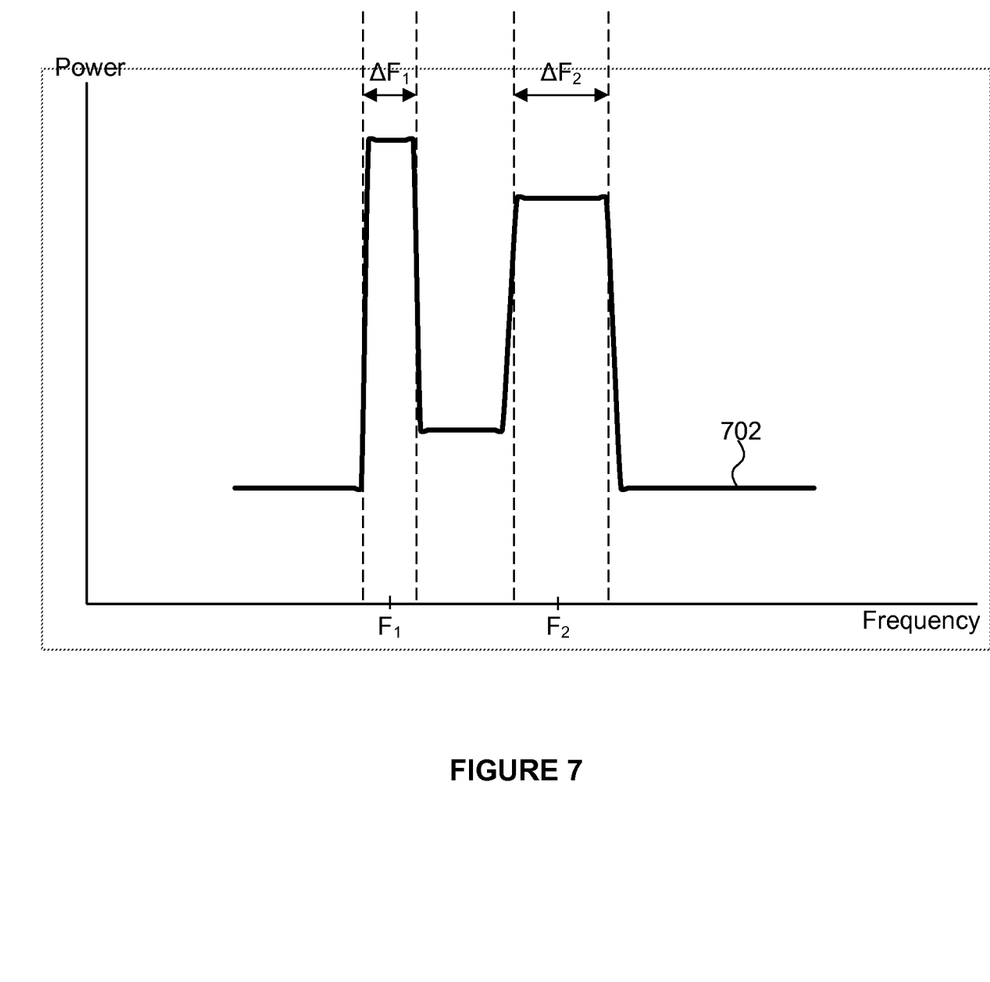
FIG. 7 is a graph showing a first example of a section of the power of received satellite signals as a function of frequency.

FIG. 7 is a graph showing a first example of a section of the estimate of the strength of the received signals (denoted with line 702) as a function of frequency. In the section of the strength estimate shown in FIG. 7, there is a first rising edge, then a first falling edge, then a second rising edge and then a second falling edge. The frequency interval $\Delta F_1$ between the first rising edge and the first falling edge represents a thin channel, i.e. it is too short to be identified as a candidate satellite channel by the channel identifier module 304 when searching at the medium or wide scales. The frequency interval $\Delta F_2$ between the second rising edge and the second falling edge represents a medium channel, i.e. it is too short to be identified as a candidate satellite channel by the channel identifier module 304 when searching at the wide scale, and too long to be identified as a candidate satellite channel by the channel identifier module 304 when searching at the thin scale. As an example, the edge detection module 304 may perform edge detection on a wide scale but might not find any of the rising or falling edges when operating on the wide scale because all of the edges shown in FIG. 7 are too steep to be detected as edges of wide channels. Continuing with this example, the edge detection module 304 then performs edge detection on a medium scale and finds the second rising edge shown in FIG. 7 which has a suitable gradient for an edge of a channel at the medium scale, but the edge detection module 304 might not find the first rising edge when operating at the medium scale because the first rising edge is too steep to be an edge of a channel with a medium bandwidth. At a frequency interval $\Delta F_2$ above the frequency of the second rising edge, the edge detection module 304 finds the second falling edge which has a suitable gradient for an edge of a channel at the medium scale and, on that basis, the analysis module 316 may determine that there is a candidate channel having a bandwidth of $\Delta F_2$, with a centre frequency of $F_2$. Continuing with this example, the edge detection module 304 then performs edge detection on a thin scale and finds the first rising edge shown in FIG. 7 which has a suitable gradient for an edge of a channel at the thin scale. At a frequency interval $\Delta F_1$ above the frequency of the first rising edge, the edge detection module 304 finds the first falling edge which has a suitable gradient for an edge of a channel at the thin scale and, on that basis, the analysis module 316 may determine that there is a candidate channel having a bandwidth of $\Delta F_1$, with a centre frequency of $F_1$. Therefore the channel identifier module 304 identifies two candidate satellite channels in the section shown in FIG. 7. The scanning module 306 may then perform the targeted scan for each of the candidate satellite channels to identify which of the candidate satellite channels correspond to actual satellite channels in the satellite broadcast spectrum, based on whether the received signals can be properly decoded.

Figure 8:
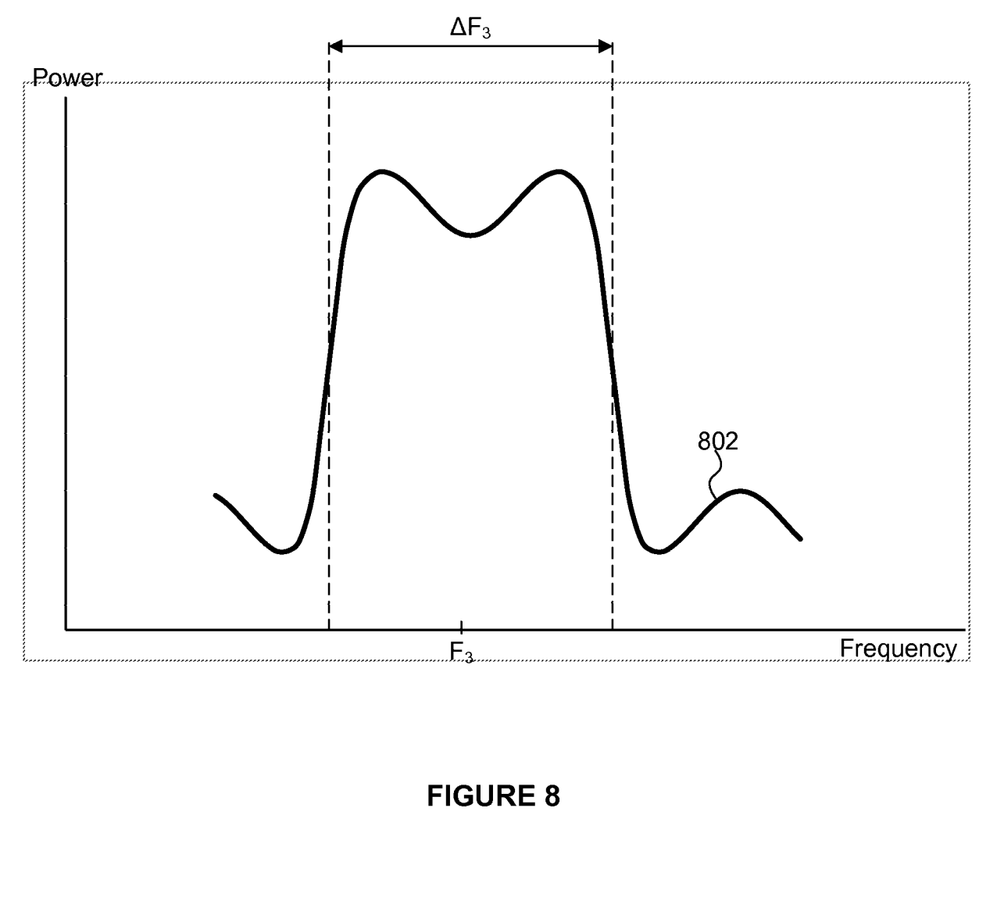
FIG. 8 is a graph showing a second example of a section of the power of received satellite signals as a function of frequency.

FIG. 8 is a graph showing a second example of a section of the estimate of the strength of the received signals (denoted with line 802) as a function of frequency. In the section of the strength estimate shown in FIG. 8, there is a rising edge, then a falling edge. There is also a sinusoidal noise component in the frequency domain which may represent an echo in the received signal. The frequency interval $\Delta F_3$ between the rising edge and the falling edge represents a wide channel, i.e. it is too long to be identified as a candidate satellite channel by the channel identifier module 304 when searching at the medium or thin scales. The edge detection module 304 performs edge detection on a wide scale and finds the rising edge shown in FIG. 8 which has a suitable gradient for an edge of a channel at the wide scale. At a frequency interval $\Delta F_3$ above the frequency of the rising edge, the edge detection module 304 finds the falling edge which has a suitable gradient for an edge of a channel at the wide scale and, on that basis, the analysis module 316 may determine that there is a candidate channel having a bandwidth of $\Delta F_3$, with a centre frequency of $F_3$. The sinusoidal noise component causes the strength of the received signal in the frequency domain to vary such that the shape of the spectrum in the example shown in FIG. 8 is similar to that in the example shown in FIG. 7 in which there are two channels. However, in FIG. 8, the rising edge and the falling edge are not steep enough to be detected as edges of channels when the edge detection module 304 is operating at the medium or thin scale. Therefore the edge detection module 304 does not incorrectly identify the presence of two thinner channels in the example shown in FIG. 8.

There are therefore described herein methods and apparatus for satellite scanning which identify satellite channels within a satellite broadcast spectrum without any prior knowledge of the satellite channels. The "apparatus" comprises the components which are used to implement the methods described herein. Rather than scanning the entire satellite broadcast spectrum at each possible combination of frequency and symbol rate, spectrum analysis is performed over the satellite broadcast spectrum in order to determine an estimate of signal strength over the satellite broadcast spectrum in the frequency domain. The estimate of signal strength in the frequency domain is used to identify candidate satellite channels (e.g. at frequencies where the signal strength is high). A targeted scan of the satellite broadcast spectrum can then be performed based on the identified candidate satellite channels in order to identify the satellite channels. A useful aspect of this is that the estimate of the signal strength in the frequency domain is used to identify frequencies at which candidate satellite channels do not occur. The targeted scan of the satellite broadcast spectrum does not need to include searching at frequencies at which candidate satellite channels are not present. With reference to the example shown in FIG. 6, there are large frequency gaps between the candidate satellite channels having centre frequencies $F_1$ and $F_2$ and between the satellite channels having centre frequencies $F_5$ and $F_6$. Preferably, the targeted scan performed by the scanning module 306 does not include scanning at frequencies in these gaps between the candidate satellite channels. This greatly reduces the number of frequencies at which the satellite receiver modules of the scanning module 306 perform the scan. In other words, the two dimensional search space (over frequency and symbol rate) that is covered by the scanning performed by the scanning module 306 is greatly limited. As described above, this can reduce the amount of time taken to identify the satellite channels from approximately 20 minutes in the system described above in the background section, in which a blind scan of all of the frequencies and symbol rates within the satellite broadcast spectrum are scanned to approximately 40 seconds by targeting the scan based on the analysis of the strength of the received signals over the satellite broadcast spectrum in the frequency domain.

In some systems, prior knowledge of the frequencies and symbol rates at which satellite channels are broadcast may be available to a satellite receiver, e.g. in the form of a look up table. In that case, the satellite receiver may be able to perform a targeted scan of the satellite broadcast spectrum based on the prior knowledge of the frequencies and symbol rates at which the satellite channels are broadcast. For example, if the location of a satellite receiver is known (e.g. using a postcode), then this may be used to determine (e.g. from a look up table) which satellites are broadcasting to the location of the satellite receiver and to thereby determine which satellite channels should be available at the satellite receiver. The satellite receiver can then perform a targeted scan of the satellite broadcast spectrum based on this knowledge of which satellite channels should be available at the location of the satellite receiver. However, in some situations, the satellite receiver may not be able to determine which satellites are broadcasting to the satellite receiver, e.g. if the location of the satellite receiver is not known. Furthermore, the prior knowledge of the satellite channels which are broadcast may not be available to the satellite receiver. In the case of a dynamically changing spectrum, an up to date table of what is on that spectrum would be needed, so an internet connection may be needed to get this information, which may or may not be available at the receiver 108. Therefore, the use of the look up table relies on some user input. The methods described above, overcome a lack of prior knowledge of the satellite channels that are being broadcast to the satellite receiver by analysing the received signals to determine the strength of the signals in the frequency domain to thereby identify candidate satellite channels that are being received by the satellite receiver.

Furthermore, systems in which prior knowledge is retrieved (e.g. from look up table based on the location (e.g. postcode) of the satellite receiver) in order to determine the frequencies and symbol rates at which satellite channels are broadcast, use information relating to the frequencies and symbol rates at which the satellite channels are broadcast from satellites. However, the frequency reference 210 of the satellite receiver 108 may not be completely synchronized with the timing of the broadcast signals. For example, the frequency reference 210 may not be very accurate because it may be desirable to keep the costs of the hardware in the satellite receiver low. Therefore, there may be an error in the frequency and/or symbol rate that a satellite channel is supposed to have and the frequency and/or symbol rate at which the satellite receiver 108 "sees" the satellite channel. As described above, when a satellite receiver module searches for a satellite channel at a particular centre frequency, f, it will find satellite channels with centre frequencies in a range e.g. from $$f - \frac{b}{4} \text{ to } f + \frac{b}{4},$$

where b is the bandwidth of the satellite channel. Therefore, for wide satellite channels with high symbol rates (i.e. where b is high, e.g. 45 MHz) it might not be significant if the frequency according to the frequency reference 210 differs from the frequency at which the satellite channel is supposed to be broadcast by a small amount, δF, where δF may for example be 1 MHz. However, for narrow satellite channels with low symbol rates (i.e. where b is low, e.g. 330 kHz) it might be significant if the frequency according to the frequency reference 210 differs from the frequency at which the satellite channel is supposed to be broadcast by 1 MHz. In this case, the discrepancy between the frequency reference 210 and the timing of the broadcast signals might prevent the satellite receiver from correctly identifying narrow satellite channels.

In contrast, in the methods described herein, in which the spectrum analysis of the received signals is performed in order to identify candidate satellite channels, will not have a similar problem. This is because the frequency reference 210 is used to control the timing of all of the modules in the satellite receiver 108. That is, the timing of the spectrum analysis module 302 and the channel identifier module 304 are controlled in accordance with the frequency reference 210 such that the candidate satellite channel frequencies are the frequencies at which the satellite receiver 108 "sees" the candidate satellite channels, which is not necessarily the same as the frequencies at which those satellite channels are supposed to be broadcast. Therefore, any inaccuracies in the frequency reference 210 will affect the spectrum analysis module 302, channel identifier module 304 and scanning module 306 to the same extent such that the inaccuracies do not prevent the satellite receiver 108 from finding the satellite channels in the satellite broadcast spectrum. Therefore, the method described herein of performing spectrum analysis and edge detection does not require any prior knowledge to be available as to the frequencies at which the satellite channels are supposed to be broadcast and may actually be preferable to looking up the frequencies at which satellite channels are supposed to be broadcast because it overcomes problems associated with discrepancies between the timing of the frequency reference 210 and the timing of the broadcast signals.

Conventional satellite receivers typically do not perform any processing of signals in the frequency domain. That is in contrast to the satellite receiver 108 described in the examples herein in which received signals are processed in the frequency domain in order to identify candidate satellite channels such that a targeted scan can be performed (rather than a blind scan) even in the case that no prior knowledge of the satellite channels is available to the satellite receiver.

The method of scanning the satellite broadcast spectrum may be performed in software. For example, a computer program product may be provided which is configured to scan the satellite broadcast spectrum, and which is embodied on a computer-readable storage medium (e.g. stored in a memory of the satellite receiver 108, which is not shown in the Figures) and configured so as when executed on the processor 204 to perform the scanning methods of the examples described herein, e.g. by implementing the spectrum analysis module 302, the channel identifier module 304 and the scanning module 306 as software modules.

In examples described above the edge detection is performed at three different scales. In other examples, the edge detection may be performed just at one scale, or at any number of different scales.

In the examples described above, the channel identifier includes the edge detector module 314. The edge detector module 314 is just one example of a module which may be used in the channel identifier module 304 to identify candidate satellite channels from the estimate of the strength of the received signals in the frequency domain. In other examples, a different type of channel identifier module may be used which does not include an edge detector module. The channel identifier module would be configured to identify candidate satellite channel frequencies within the satellite broadcast spectrum using the estimate of the strength of the received signals in the frequency domain. For example if the results of the FFT from the spectrum analyser module 302 could be cleaned up significantly, the channel identifier module 304 could identify the channels by matching the shapes of the channels against ideal channels. Alternatively the channel identifier module 304 could find flat sections of the spectrum of a suitable width to be a channel top, and then check that the noise around them is below a suitable SNR threshold to indicate that this is a channel.

Furthermore, in examples described above, e.g. as shown in FIGS. 5 to 8, the estimate of the strength of the received signals is an estimate of the power of the received signals. In other examples, other parameters which are indicative of the strength of the received signals may be used, such as the peak amplitude of the received signals.

The examples described in detail above relate to identifying satellite channels within a satellite broadcast spectrum. As mentioned above, corresponding methods could be used to identify transmission channels within other types of transmission spectra (e.g. to identify broadcast channels within other types of broadcast spectra). That is, the methods described herein could be used to scan any transmission spectrum, wherein transmission signals are received at a receiver, to thereby identify candidate transmission channel frequencies and/or symbol rates for use in targeting a scan over the transmission spectrum to thereby identify transmission channels within the transmission spectrum. The transmission signals may be received via a wireless or a wired channel. The transmission signals may for example be terrestrial broadcast signals, such asterrestrial television signals or radio broadcast signals. In other words, in some examples, the transmission spectrum may be a terrestrial broadcast spectrum (rather than a satellite broadcast spectrum as in the examples described in detail above), and the transmission channels may be terrestrial broadcast channels (rather than satellite channels as in the examples described in detail above), such that the transmission channel frequencies may be terrestrial broadcast channel frequencies (rather than satellite channel frequencies as in the examples described in detail above). As another example, the transmission spectrum may be for use in mobile telephony, wherein the techniques described herein can be used to quickly identify channels of a mobile telephone network by limiting the scope of a targeted scan based on an analysis (in the frequency domain) of received signals over the transmission spectrum of the mobile telephone network. In a corresponding manner to that described above in relation to satellite signals, in order to identify the channels in a mobile telephone network (or in any other transmission system) rather than scanning the entire transmission spectrum at each possible combination of frequency and symbol rate, spectrum analysis may be performed over the transmission spectrum in order to determine an estimate of signal strength over the transmission spectrum in the frequency domain. The estimate of signal strength in the frequency domain can be used to identify candidate transmission channels of the mobile telephone network (e.g. at frequencies where the signal strength is high). A targeted scan of the transmission spectrum of the mobile telephone network can then be performed based on the identified candidate transmission channels in order to identify the transmission channels of the mobile telephone network. As an example, this may be useful for reducing the time taken for a cell search, when a mobile telephone is searching for a mobile channel on which it can communicate. This may be used for mobile telephone networks operating using the Long-Term Evolution (LTE) standard, or any other suitable mobile telephony standard according to which signals may be transmitted in the mobile telephone network.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of scanning a transmission spectrum, the method comprising:
   analysing received signals over the transmission spectrum to determine an estimate of signal strength of the received signals as a function of frequency over the transmission spectrum;
   using the estimate of the strength of the received signals to identify candidate transmission channel frequencies within the transmission spectrum by: (i) performing edge detection on the estimate of the strength of the received signals in the frequency domain, and (ii) using the edge detection to search for a pattern in the estimate of the strength of the received signals in the frequency domain which is indicative of a candidate transmission channel, said pattern comprising a rising edge, a frequency interval and a falling edge, wherein the frequency interval between the rising edge and the falling edge is suitable for a transmission channel; and
   performing a targeted scan over the transmission spectrum based on the identified candidate transmission channel frequencies to thereby identify at least one transmission channel within the transmission spectrum.

2. The method of claim 1 wherein:
   (i) the transmission spectrum is a satellite broadcast spectrum, wherein the transmission channels are satellite channels, and wherein the transmission channel frequencies are satellite channel frequencies;
   (ii) the transmission spectrum is a terrestrial broadcast spectrum, wherein the transmission channels are terrestrial broadcast channels, and wherein the transmission channel frequencies are terrestrial broadcast channel frequencies; or
   (iii) the transmission spectrum is for use in mobile telephony, wherein the transmission channels are channels of a mobile telephone network, and wherein the transmission channel frequencies are channel frequencies of the mobile telephone network.

3. The method of claim 1 wherein the rising and falling edges of the pattern have gradients which are suitable for a transmission channel with said frequency interval.

4. Apparatus configured to scan a transmission spectrum, the apparatus comprising:
   a spectrum analyser module configured to analyse received signals over the transmission spectrum to determine an estimate of signal strength of the received signals as a function of frequency over the transmission spectrum;
   a channel identifier module configured to identify candidate transmission channel frequencies within the transmission spectrum using the estimate of the strength of the received signals; and
   a scanning module configured to perform a targeted scan over the transmission spectrum based on the identified candidate transmission channel frequencies to thereby identify one or more transmission channels within the transmission spectrum,
   wherein the channel identifier module comprises:
      an edge detector module configured to perform edge detection on the estimate of the strength of the received signals in the frequency domain; and
      an analysis module configured to use the results of the edge detection to identify candidate transmission channel frequencies within the transmission spectrum by searching for a pattern in the estimate of the strength of the received signals in the frequency domain which is indicative of a candidate transmission channel, said pattern comprising a rising edge, a frequency interval and a falling edge, wherein the frequency interval between the rising edge and the falling edge is suitable for a transmission channel.

5. The apparatus of claim 4 wherein the transmission spectrum is a satellite broadcast spectrum, wherein the transmission channels are satellite channels, and wherein the transmission channel frequencies are satellite channel frequencies.

6. The apparatus of claim 4 wherein the transmission spectrum is a terrestrial broadcast spectrum, wherein the transmission channels are terrestrial broadcast channels, and wherein the transmission channel frequencies are terrestrial broadcast channel frequencies.

7. The apparatus of claim 4 wherein the transmission spectrum is for use in mobile telephony, wherein the transmission channels are channels of a mobile telephone network, and wherein the transmission channel frequencies are channel frequencies of the mobile telephone network.

8. The apparatus of claim 4 wherein the rising and falling edges of the pattern have gradients which are suitable for a transmission channel with said frequency interval.

9. The apparatus of claim 4 wherein when searching for the pattern in the estimate of the strength of the received signals in the frequency domain the analysis module is configured to:
   identify a rising edge if: (i) the estimate of the strength of the received signals has a gradient in the frequency domain which is within a particular gradient range for a transmission channel with said frequency interval, and (ii) the value of the estimate of the strength of the received signals increases by more than a threshold increase amount; and
   identify a falling edge if: (i) the estimate of the strength of the received signals has a gradient in the frequency domain which is within a particular gradient range for a transmission channel with said frequency interval, and (ii) the value of the estimate of the strength of the received signals decreases by more than a threshold decrease amount.

10. The apparatus of claim 4 wherein the channel identifier module is further configured to use the estimate of the strength of the received signals to identify candidate symbol rates for respective candidate transmission channels at the identified candidate transmission channel frequencies, wherein frequency interval of the pattern corresponds to a candidate symbol rate of a candidate transmission channel, and wherein the scanning module is configured to use the identified candidate symbol rates for said targeted scan to identify the one or more transmission channels within the transmission spectrum.

11. The apparatus of claim 4 wherein the edge detector module is configured to perform the edge detection at a plurality of different scales which are associated with respective frequency ranges, wherein the analysis module is configured to search, at each of the scales, for a pattern with a frequency interval within the respective frequency range.

12. The apparatus of claim 11 wherein the edge detector module is configured to detect, at each of the scales, edges which have a gradient within a particular gradient range which is indicative of channels with a bandwidth within the frequency range for the scale.

13. The apparatus of claim 11 wherein there are three different scales: a wide scale, a medium scale and a thin scale, wherein the wide scale is associated with a higher frequency range than the medium scale, and wherein the medium scale is associated with a higher frequency range than the thin scale;
and wherein the analysis module is configured to use the edge detection to search for a pattern in the estimate of the strength of the received signals at the wide scale then at the medium scale and then at the thin scale.

14. The apparatus of claim 4 wherein the spectrum analyser module is configured to perform a Fourier analysis on the received signals to determine said estimate of the strength of the received signals as a function of frequency over the transmission spectrum.

15. The apparatus of claim 14 wherein the spectrum analyser module is configured to:
perform the Fourier analysis separately over different sections of the transmission spectrum; and
combine the results of the Fourier analysis over the different sections to determine the estimate of the strength of the received signals as a function of frequency over the transmission spectrum.

16. The apparatus of claim 4 wherein the scanning module comprises a plurality of receiver modules for a respective plurality of transmission standards, each of the receiver modules being configured to identify transmission channels adhering to the respective transmission standard within the transmission spectrum, wherein the plurality of receiver modules are configured to operate in series, and wherein the scanning module is configured to pass information determined from the targeted scan performed by one of the receiver modules to a later one of the receiver modules in the series for use in directing the targeted scan performed by the later receiver module.

17. The apparatus of claim 4 wherein the channel identifier module comprises a filtering module configured to filter the estimate of the strength of the received signals to suppress noise therein, and wherein the apparatus is configured to identify an echo in the received signal, wherein said filtering module is configured to apply compensation to attenuate the echo in the estimate of the strength of the received signals.

18. The apparatus of claim 4 configured to store characteristics of the identified transmission channels.

19. The apparatus of claim 4 wherein the apparatus is implemented in a receiver configured to decode the received signal in the identified one or more transmission channels, and wherein the apparatus further comprises a receiver module configured to receive the signals.

20. A computer program product configured to scan a transmission spectrum, the computer program product comprising a non-transitory computer-readable storage medium having computer-executable instructions stored therein, which when executed by a computer cause the computer to:
analyse received signals over the transmission spectrum to determine an estimate of signal strength of the received signals as a function of frequency over the transmission spectrum;
use the estimate of the strength of the received signals to identify candidate transmission channel frequencies within the transmission spectrum by: (i) performing edge detection on the estimate of the strength of the received signals in the frequency domain, and (ii) using the edge detection to search for a pattern in the estimate of the strength of the received signals in the frequency domain which is indicative of a candidate transmission channel, said pattern comprising a rising edge, a frequency interval and a falling edge, wherein the frequency interval between the rising edge and the falling edge is suitable for a transmission channel; and
perform a targeted scan over the transmission spectrum based on the identified candidate transmission channel frequencies to thereby identify at least one transmission channel within the transmission spectrum.

* * * * *